United States Patent [19]

Higley et al.

[11] 4,069,151

[45] Jan. 17, 1978

[54] THIN POLYCARBONATE MEMBRANES FOR USE IN HEMODIALYSIS

[75] Inventors: Willard S. Higley, Glendora; Paul A. Cantor, Los Angeles; Bruce S. Fisher, Covina, all of Calif.

[73] Assignee: C. R. Bard, Inc., Murray Hill, N.J.

[21] Appl. No.: 672,354

[22] Filed: Mar. 31, 1976

[51] Int. Cl.$^2$ .............................................. B01D 31/00
[52] U.S. Cl. .......................... 128/214 R; 210/321 B; 210/500 M
[58] Field of Search .................. 55/16, 158; 210/23 F, 210/23 H, 321 R, 500 M, 22, 321 B; 260/2.5 M

[56] References Cited

U.S. PATENT DOCUMENTS

| 3,526,588 | 9/1970 | Michaels et al. | 210/500 M X |
| 3,615,024 | 10/1971 | Michaels | 210/500 M X |
| 3,653,180 | 4/1972 | Juliano et al. | 55/16 |
| 3,781,378 | 12/1973 | Kantor et al. | 210/500 M X |
| 3,945,926 | 3/1976 | Kesting | 210/500 M |

*Primary Examiner*—Wilbur L. Bascomb, Jr.
*Assistant Examiner*—Robert H. Spitzer
*Attorney, Agent, or Firm*—C. E. Martine, Jr.

[57] ABSTRACT

Thin membranes for hemodialysis prepared from polycarbonate materials have superior transport properties for middle molecular weight molecules than do cellulosic membranes or previously available thicker polycarbonate membranes while having an ultrafiltration rate less than that obtainable with thicker polycarbonate membranes. Thin polycarbonate membranes with a thickness of about 0.8 mil, an ultrafiltration rate of about 3.5 ml/hr/M$^2$/mmHg, a sodium chloride diffusive permeability of about 830 cm/min($\times 10^{-4}$) at 37° C and a vitamin B$_{12}$ diffusive permeability of about 114 cm/min $\times 10^{-4}$ at 37° C have been produced.

7 Claims, No Drawings

THIN POLYCARBONATE MEMBRANES FOR USE IN HEMODIALYSIS

This invention relates to new and improved polycarbonate membranes which are especially useful for hemodialysis.

Hemodialysis membranes for use in the artificial kidney are at the present time generally made of cellophane materials. The best of these materials currently available for such purpose has been found to be a cellulose regenerated from a cuproammonium solution, plasticized with glycerol and identified by the trademark "Cuprophan". Although Cuprophan membranes provide ultrafiltration rates and clearance of low molecular weight solutes within the desirable ranges for proper hemodialysis, they still have many deficiencies which prevent them from being completely satisfactory as hemodialysis membranes. Certain toxins which it is thought necessary to remove from the blood by hemodialysis are "middle molecules". i.e., undefined molecules of molecular weights in the range of 300 to 5,000 Daltons. Such "middle molecules" pass through Cuprophan membranes at rates much slower than is desirable. Babb et al. ("The Genesis of the Square Meter-Hour Hypothesis" *Trans. ASAIO, Vol. XVII,* (1971) p 81–91) advanced the hypothesis that higher molecular weight metabolites (middle molecules) are important uremic toxins. Recent work has shown that the blood from uremic patients exhibits a significant amount of certain "middle molecules", particularly in the range of 300 to 1,500 molecular weight, which are not detected in nonuremics. Babb et al. ("Hemodialyzer Evaluation By Examination of Solute Molecular Spectra" *Trans. ASAIO, Vol. XVIII* (1972) p 98–105). Popovich et al. ("The Prediction of Metabolite Accumulation Concomitant With Renal Insufficiency: The Middle Molecule Anomaly" *Trans ASAIO, Vol XX* (1974) p 377–387) discuss the results of numerous clinical investigators who explored the connection of neuropathy to "middle molecule" concentrations. Additionally, the burst and tear strengths of Cuprophan membranes are lower than is desirable in materials employed in hemodialysis and their shelf-life is low, apparently due to migration of plasticizer during storage. Further, the permeability of the Cuprophan membranes has been found to vary from batch to batch and to decrease on aging. Lastly, it is very difficult to cause adhesion between Cuprophan and other materials and between Cuprophan and itself. Thus, it is difficult to utilize improved hemodialyzer designs requiring leak-proof compartments which depend upon the membrane material for sealing off blood from dialysate solution and blood and dialysate solutions from the atmosphere.

Polycarbonate membranes suitable for hemodialysis purposes were disclosed by B. S. Fisher et al. in ("Modified Polycarbonate Membranes for Hemodialysis", *Trans ASAIO, Vol XIX* (1973) p 429–434) and clinical evaluations of these membranes were reported by B. H. Barbour et al. in ("Clinical Use of NISR 440 Polycarbonate Membranes for Hemodialysis", *Trans ASAIO, Vol XXI* (1975) p 144–154). Additional information relating to these membranes were published in the following reports:

1. Modified Polycarbonate Membranes for Hemodialysis. National Institute of Scientific Research, Rancho Santa Fe, California. Ann. Rept. July 1, 1970 – Dec. 31, 1971. PB-213 160/6. This document was received in NTIS (National Technical Information Service) in January, 1973, and was announced in the bi-weekly journal, GRA, Number 2, dated Jan. 25, 1973.
2. Modified Polycarbonate Membranes for Hemodialysis. National Institute of Scientific Research, Rancho Santa Fe, California. Ann. Rept. Jan. 1 – Dec. 31, 1972. PB-225 043/9. This document was received in NTIS in January, 1974, and was announced in the bi-weekly journal, GRA, Number 3, dated Feb. 8, 1974.
3. Modified Polycarbonate Membranes for Hemodialysis. National Institute of Scientific Research, Rancho Santa Fe, California. Rept. June 15 – Sept. 20, 1969. PB-225 135/3. This document was received in NTIS in December, 1973, and was announced in the bi-weekly journal, GRA, Number 2, dated Jan. 25, 1974.
4. Modified Polycarbonate Membranes for Hemodialysis. National Institute of Scientific Research, Rancho Santa Fe, California. Ann. Rept. Aug. 1, 1973 – Mar. 31, 1974. PB-233 669/1. This document was received in NTIS in August, 1974, and was announced in the bi-weekly journal, GRA, Number 18, dated Sept. 6, 1974.
5. Modified Polycarbonate Membranes for Hemodialysis. National Institute of Scientific Research, Rancho Santa Fe, California. National Institute of Arthritis and Metabolic Diseases, Bethesda, Maryland. Ann. Rept. Jan. 1 – July 31, 1973. PB-235 792/9SL. This document was received in NTIS in October, 1974, and was announced in the bi-weekly journal, GRA, Number 24, dated Nov. 29, 1974.
6. Modified Polycarbonate Membrane for Hemodialysis. National Institute of Scientific Research, Rancho Santa Fe, California. Final Report Mar. 31, 1974 – June 30, 1975. Submitted to the National Institute of Arthritis, Metabolism and Digestive Diseases, National Institutes of Health September 1975.

These polycarbonate membranes, as reported by Barbour et. al., had thicknesses of 1.1 to 1.4 mil, burst strengths of 33 to 37 cm Hg, ultra filtration rates of 3.4 to 5.3 ml/hr M$^2$/mm Hg, and diffusive permeability (cm/min $\times$ 10$^4$ at 37° C) to sodium chloride, urea, and vitamin B$_{12}$ as follows:

P NaCl = 640–750    P Urea = 713–815,    P B$_{12}$ = 91–106

The Barbour et al. article, which compares these properties with those obtained for Cuprophan membranes, indicated that the ultrafiltration rate of polycarbonate is 1.25 to 2.0 times the ultrafiltration rate obtained with Cuprophan membranes and that the ratio of permeabilities to urea and vitamin B$_{12}$ are 1.09 and 2.96 respectively.

Continued fabrication of membranes such as those tested by Barbour et. al. has resulted in membranes having the average properties listed in Table 1, of Example 1, as "thick membranes".

Use of the 1.2 mil thick polycarbonate membranes in D4 Kiil dialyzers in place of Cuprophan membranes, which measure 0.9 mil thick, resulted in a decrease in the spacing in the blood compartment and increased transmembrane pressures. In order to make the polycarbonate membrane more compatible for use in dialyzers designed to incorporate Cuprophan membranes, adjustments were made in the polycarbonate membrane casting procedure so that an 0.8 mil membrane could be produced. Reduction in the membrane thickness by 33% resulted in an expected increased permeability to urea, creatinine and vitamin $B_{12}$ and a slight reduction in strength. However, the ultrafiltration rate, instead of increasing as would be expected with a thinner membrane, was descreased by 33%. The resulting thin membrane exhibited an ultrafiltration rate closer to that of Cuprophan membrane while having diffusivities to middle molecules superior to those previously demonstrated with thick polycarbonate membranes without a detrimental decrease in strength.

The membranes prepared from the present invention are significantly improved over the state-of-the-art materials, such as, Cuprophan membranes and thick polycarbonate membranes in the following areas:

1. Thin polycarbonate membranes permit clearance of the critical "middle molecule" vitamin $B_{12}$ at 4.3 times greater than Cuprophan and 1.3 times thick polycarbonate in comparable tests while exhibiting an ultrafiltration rate of 1.2 to 1.6 times Cuprophan membranes and 0.67 to 0.9 times thick polycarbonate membrane.
2. Thin polycarbonate membranes are stiffer than Cuprophan in the wet state while being thinner than Cuprophan. This property results in thinner blood layers in dialyzers, more efficient dialysis and lower blood priming volume.
3. Due to greater efficiency of dialysis of middle molecules with thin polycarbonate membranes, projections indicate that dialysis time can be further reduced from those required with Cuprophan membranes.
4. The slightly increased permeability of the thin membrane to urea and sodium chloride, as compared to thick polycarbonate membrane makes possible the reduced time dialysis of patients with partial kidney function without adversely affecting the dialysis rate of those patients with no residual kidney functions.

In attempting to develop hemodialysis membranes with mechanical and transport properties superior to those of Cuprophan, it has previously been proposed, by two of the present co-inventors, to fabricate membranes of polyether-polycarbonate block copolymers containing a balance of hydrophobic aromatic polycarbonate blocks, which impart toughness, and hydrophilic polyether blocks, which impart water and solute permeability. The polycarbonate system was chosen for dialysis membrane development because of the outstanding mechanical properties shown by commercial polycarbonate, the very low thrombogenicity exhibited by properly heparinized polycarbonate surfaces, the ease of forming this polymer type into various configurations such as films and fibers, and the many synthetic possibilities for chemical modification of the basic aromatic polycarbonate backbone structure to achieve desired membrane transport properties. As disclosed in the "Proceedings of the 5th Annual Contractors' Conference of the Artificial Kidney Program of the National Institute of Arthritis and the Metabolic Diseases", U.S. Department of Health, Education and Welfare (1972), pages 32–33, gelled membranes were prepared from polyether-polycarbonate block copolymers by means of the phase inversion technique, i.e., casting a solution of the copolymer in a suitable solvent onto a substrate surface to form a layer which is allowed to dry only partially and which is then immersed in a liquid gelation medium in which the copolymer is insoluble but which is miscible with the solvent, employing chloroform as the casting solvent and methanol as the gelation medium. The gelled membranes resulting from such procedure, while exhibiting considerable superiority over Cuprophan membranes in their permeabilities to solutes in the "middle molecule" range, were found, however, to possess several drawbacks to their practical use as hemodialysis membranes. First of all, their ultrafiltration rates were 2 to 5 times that of Cuprophan membranes, which would be clinically unacceptable for hemodialysis as presently administered due to the possibility of dehydration of the patient occurring during treatment. Secondly, their burst strength was no more, and in many cases, less than that of Cuprophan membranes. Thirdly, attempts at continuous casting of the membrane on production-type machinery in widths suitable for use in commercial hemodialyzers, presented further problems which rendered the methanol gelation procedure impractical for commercial hemodialysis membrane production.

The most serious problem encountered was the frequent occurrence of gross leakage of albumin through the membranes during ultrafiltration testing, and which was found to be attributable to holes or other imperfections in the ultrathin surface of the membrane which forms the barrier between the blood and the dialysate or flushing solution. All of these membranes are referred to as being "anisotropic" or "skinned", which means that their two sides are significantly different from each other, one side being relatively smooth and the other side being relatively rough and porous. The smooth side is the "barrier" layer which faces the blood during hemodialysis and is quite thin, on the order of 0.05 to 0.2 microns. The remainder of the membrane merely functions as a support structure and is about 25 to 30 microns in thickness. The integrity of the barrier layer is crucial to the performance of the membrane in dialysis. Any perforation, puncture or other compromise of the integrity of the barrier layer destroys the usefulness of the membrane and all materials in contact with the membrane merely leak through. It has now been proven by electron microscopy that the methanol-gelled polycarbonate membranes are formed with their barrier layer on the side of the membrane contacting the casting surface rather than the side of the membrane facing the air during drying. The significance of this fact it that continuous casting of these membranes on production-type machinery involves continuously peeling the delicate barrier layer off of the casting surface during the process, making it almost impossible to maintain the integrity of the barrier layer and obtain a membrane suitable for use in hemodialysis. Also, it was found that long term exposure of the membrane to methanol affects the membrane properties, thereby necessitating the quick and extensive flushing or washing of the membrane to remove the methanol therefrom and replace it with water in order for the membrane to have adequate shelf-life. One additional problem presented was the impracticality of employing large volumes of methanol as the gelation medium due to the cost, toxicity and flammability of this material.

Membranes of polycarbonate type have been made by other investigators such as suggested in British patent specification No. 1,395,530, but these membranes have been found unsuitable for hemodialysis purposes.

See also Kesting, *J. Macromol, Sci. (Chem)*, $A4_{(3)}$, pp. 655–664 (1970); U.S. Pat. Nos. 2,964,794, 3,031,328, 3,450,650, 3,526,588 and 3,655,591; and British patent specification No. 1,059,945.

It is therefore an object of the present invention to provide hemodialysis membranes having improved permeability to solutes in the middle molecule range as compared with presently available hemodialysis membranes and a reduced ultrafiltration rate when compared with thick polycarbonate membranes.

Another object of the invention is to provide hemodialysis membranes which are stronger than the standard NIAMDD reference membrane while having the same thickness.

Still another object of the invention is to provide a process for producing gelled polycarbonate membranes useful for hemodialysis and having the improved properties as set forth in the preceding objects, which is easily and economically adaptable to large scale machine production without imparing the integrity of the barrier layer of the membrane.

The above and other objects may be achieved in accordance with the present invention by producing a gelled polycarbonate membrane from a polyether-polcarbonate block copolymer by the phase inversion technique employing an aqueous gelation system with water as the gelling medium and a water-miscible organic solvent as the casting solvent. More specifically, this process comprises casting on to a substrate surface having a smooth finish, a layer of casting solution comprising a polyether-polycarbonate block copolymer containing from about 5 to about 35% by weight of the polyether component and a water-miscible organic solvent together with a cosolvent which acts as a swelling agent for the copolymer, drying the layer to partially evaporate the solvents therefrom, immersing the partially dried layer in water to form a gelled membrane, and stripping the resulting gelled membrane from the substrate surface.

It has been found that gelled polycarbonate membranes produced in this manner, with water as the gelling medium, are formed with their barrier layer on the side of the membrane facing the air during drying, rather than on the side of the membrane in contact with the casting surface as is the case with methanol-gelled polycarbonate membranes, which enables the gelled membrane to be readily stripped from the casting surface without impairing the integrity of the delicate barrier layer, thereby rendering large-scale machine production of such membranes practical. The use of water as a gelling medium in place of methanol also facilitates large scale machine production in that water is, of course, less expensive, non-toxic and non-flammable, and also eliminates the necessity for the extensive flushing or washing of the membrane to remove the gelling medium therefrom as was required in methanol gelation. It has also been found that the water-gelled polycarbonate membranes have considerably higher strength than either the methanol-gelled polycarbonate membranes or Cuprophan membranes. Gelled polycarbonate membranes fabricated in accordance with the present invention have furthermore been found to be considerably superior to Cuprophan membranes in their permeabilities to solutes in the middle molecule range while maintaining ultrafiltration rates and clearance of low molecular weight solutes comparable to that of Cuprophan membranes. Moreover, it has been found that the ultrafiltration rates of the membranes fabricated in accordance with the present invention are controllable to levels comparable to those of Cuprophan membranes by proper selection of the molecular weight of the polyetherpolycarbonate block copolymer used in fabricating the membrane.

The polycarbonate material from which the improved hemodialysis membranes are fabricated in accordance with the present invention is a polyether-polycarbonate block copolymer preferably containing from about 5 to about 35% by weight of the polyether component. It has been found that this proportion of polyether blocks renders the normally hydrophobic polycarbonate sufficiently hydrophilic so as to make it suitable for use as a hemodialysis membrane. Certain of such block copolymers may be prepared, for example by the method of Goldberg (*Journal of Polymer Science: Part C*, No. 4, pp. 707–730 [1963] wherein a comonomer mixture of from about 95 to about 65% by weight of 2,2-(4,4'-dihydroxydiphenyl) propane, generally known as bisphenol A, and correspondingly from about 5 to about 35% by weight of a polyether glycol such as polyethylene glycol, is reacted with a carbonic acid derivative such as phosgene. A polyethylene glycol which is found to be particularly suitable is Carbowax 6000, which is a polyethylene glycol having an average molecular weight of 6700, although polyethylene glycols of other molecular weights can also be used, such as, for example, Carbowax 600, Carbowax 1000 and Carbowax 4000, which are polyethylene glycols having molecular weights of 600, 1000 and 4000, respectively.

In accordance with the above the polyether-polycarbonate block copolymer consists of recurring units of the formula

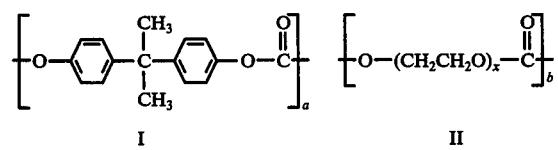

wherein $x$ is from about 12 to about 152 and $a$ and $b$ are chosen such that the bisphenol A carbonate unit (I) is about 95 to 65% of the weight of the recurring unit and the alkylene ether carbonate unit (II) is about 5 to 35% of the weight of the recurring unit. Polyether glycols other than polyethylene glycols can also be used, such as, for example, polypropylene oxide-polyethylene oxide block copolymers as exemplified by members of the Pluronic diol series such as Pluronic F68.

Polyether-polycarbonate block copolymers having molecular weights ranging from about 50,000 to about 750,000 may suitably be prepared in the above manner. A preferred range of molecular weights if from about 200,000 to about 500,000, since it has been found that membranes fabricated in accordance with the present invention from polyether-polycarbonate block copolymers having molecular weights within such preferred range exhibit ultrafiltration rates comparable to those of Cuprophan membranes and hence within the range clinically acceptable for use in hemodialysis.

Suitable casting solutions for use in producing membranes of the present invention may be prepared by dissolving the polyether-polycarbonate block copolymer in a water-miscible organic solvent for the copolymer. The solvent preferably has a boiling point within the range of 50° to 85° C for optimum room temperature casting. The preferred solvent is 1,3-dioxolane which has the appropriate combination of high solvent power for the copolymer, suitable vapor pressure at 25° C, water-miscibility and a boiling point of 75° to 76° C. Other suitable solvents which can be employed include 1,3-dioxan, 1,4-dioxan, tetrahydrofuran, butyrolactone, acetonitrile, cellosolve acetate, dimethylformamide, pyridine and mixtures thereof. Chloroform, which was previously suggested for use as a casting solvent in the methanol-gelation of polycarbonate membranes, is not suitable since it is not water-miscible.

The casting solutions are generally formulated to have a total solids content of from about 1 to about 20 weight % to give dopes ranging in viscosity from about 5,000 to about 30,000 cps. Typically, solids contents range from about 10 to about 20 weight % to give viscosities of from about 7,000 to about 25,000 cps, the preferred range. A swelling agent, such as dimethyl sulfoxide, is advantageously added to the casting solution in amounts ranging from about 10 to about 75% by weight of the copolymer, the preferred range being from about 15 to about 25% by weight of the copolymer. The addition of the swelling agent has been found to enhance the permeability of the resulting membrane. Other swelling agents which have been employed include dimethylformamide, dimethylacetamide, acetamide, formamide and pyridine.

Production of the polycarbonate membrane can be effected on a continuous basis by doctor blade casting of the casting solution onto a moving surface having a smooth finish, such as a coated release paper. The well-filtered (10 $\mu$m) casting solution is preferably supplied to a hopper placed in front of the doctor blade by means of a positive displacement metering pump. The hopper is provided with end guides for controlling the width of the membrane sheet. The thickness of the membrane sheet is controlled by adjusting the gap between the knife and the moving belt surface, which is usually set so as to give a final membrane thickness of about 0.8 mils.

The freshly cast and wet film is allowed to air dry at temperatures ranging from about 20° to about 30° C for periods ranging from about 1.0 to about 5.0 minutes to partially evaporate the solvent therefrom, the drying time being determined by both the belt speed and the drying distance. The partially dried film is gelled to produce the final membrane by immersion while still adhering to the moving belt, in a water bath. The gelation bath temperature may be varied between about zero to about 40° C, the preferred range being 20° to 30° C. After gelation, the membrane is peeled from the moving belt and rolled up separately from the belt onto a cylindrical core. The membrane is finally washed thoroughly with deionized water to remove the last traces of solvent and swelling agent and stored in a sealed plastic bag or other container containing water and a sterilant such as formaldehyde. The final thickness of the membrane generally varied from about 0.60 to 1.5 mils, depending upon the knife gap setting, casting solution viscosity and belt speed.

The following examples are given for the purpose of illustrating the present invention.

EXAMPLE 1

A mixture of 2,860 gm of the polyether-polycarbonate block copolymer obtained by reacting phosgene with a comonomer mixture of bisphenol A (75 wt %) and Carbowax 6000 (25 wt %), and having an intrinsic viscosity of 1.57 (in chloroform at 25° C) corresponding to a molecular weight of 320,200, 18,092 gm of 1,3-dioxolane and 572.0 gm of dimethyl sulfoxide, was slowly agitated until solution was effected (approximately 16 hours). The crude solution was filtered in a pressure filter at 60 psig through a stainless steel nominal 1.5 $\mu$m filter cartridge to remove a small residue of fine insoluble matter. The resulting casting solution has a viscosity of 9,713 cps at 25° C.

Approximately 5 gallons of the above filtered casting solution was cast via a doctor blade onto the surface of a 25-inch wide moving belt moving at a speed of about 3.5 feet per minute. The hopper end guides were set to provide a cast film width of 15½ inches and the gap between the doctor knife and the moving belt surface was set at approximately 7.0 mils and adjusted during production to produce a membrane of final wet thickness of 0.80 ± 0.05 mils. The casting solution is passed through a shroud 42 inches long × 38 inches wide × 6¼ inches high through which nitrogen at 235 SCFH is passed. These dimensions provide samples suitable for use in the Kiil dialyzer. A total drying time for the cast film of about 1.7 minutes was allowed before gelation in a water bath. The ambient air temperature was maintained at 25.0° ± 0.5° C and the gelation water bath temperature at 25° ± 0.5° C. After gelation, the resulting membrane was peeled from the moving belt and rolled up separately from the belt onto a cylindrical core. A total of 1,559 feet of membrane was thus produced during a period of 8 hours. The membrane was washed in a flowing stream of deionized water and stored in a sealed polyethylene bag containing 2% aqueous formaldehyde.

The polycarbonate membrane fabricated as above was found to have physical and permeability properties as set forth in Table 1 below. For purposes of comparison, corresponding values are given for a typical sample of thick polycarbonate membrane and typical test data for Cuprophan PT 150 membrane, which is the NIAMDD reference membrane, published in *Evaluation of Membranes for Hemodialyzers*, U.S. Department of Health, Education and Welfare, DHEW Publication No. (NIH) 74-605, p 68. The permeability properties were determined in a dialysis test cell of the type designed by the National Bureau of Standards.

Table 1
COMPARISON OF MEMBRANE PROPERTIES*

| PROPERTIES*** | Polycarbonate Membranes | | Cuprophan Membranes (PT150)** |
|---|---|---|---|
| | THICK | THIN | |
| DRY THICKNESS | 30$\mu$ | 21.6$\mu$ | 13.5$\mu$ |
| WET THICKNESS | 30$\mu$ (1.2 mil) | 21.6$\mu$ (0.79 ± 0.07 mil) | 22.9 (0.9 mil) |
| U.F. RATE (ml/hr/M²/mm Hg) | 4.5 ± .5 | 3.51 ± 0.08 | 2.45 |
| BURST TEST | 30cmHg | 27.6 ± 1.4 cmHg | 19cmHg |
| DIFFUSIVE PERMEABILITY (cm/min (x 10⁴) at 37° C | | | |
| NaCl | 705 ± 45 | 818 ± 94 | 518**** |
| VITAMIN $B_{12}$ | 98.3 | 118 ± 13 | 28.0 |

*NBS Cell permeabilities
**Standard NIAMDD "Reference Membrane"
***The above values are subject to a variability of plus or minus 10%
****Urea - Values for Sodium Chloride unavailable

EXAMPLE 2

Several batches of polymer were prepared and cast into thin polycarbonate membrane in the same manner as Example 1 except that polymer molecular weight, casting solution concentration and viscosity, and nitrogen flow rate and belt speed during casting were varied. These variables, along with the properties of the resultant membranes are listed in Table 2. The values for ultrafiltration rate and permeabilities are averages of determinations made at several points along the length of each membrane run, the average length of each run being about 1,350 feet. With the exception of run 11, the standard deviation for the ultrafiltration rate was less than 0.88. Run 11 showed a standard deviation of 1.21 for ultrafiltration, reflecting an increase in ultrafiltration rates from 2.64 to 6.31 as the casting progressed. It was therefore concluded that processing conditions for this run were not properly controlled and as a result the properties obtained for run 11 are not typical and should be discounted.

The remainder of the runs showed an average ultrafiltration rate of 3.53 ml/hr/M²/mmHg, a $P_{B_{12}}$/UF of 32.27 and a PNaCl/UF = 236.5.

Using the Babb-Scribner Charts for Estimating Minimum Adequate Dialysis Times for Patients in Terms of Body Size, GFR and Various Membrane/Dialyzer Combinations based on the properties of the thin membranes, projections were made of the minimum adequate dialysis time for an average body mass man (surface area 1.7M²) with no kidney function or with no Residual Glomerular Filtration Rate (G.F.R. = 0) and partial kidney function (G.F.R. = 1). The minimum required time for G.F.R = 0 using thin polycarbonate membrane is approximately 11.1 hours as compared to 18.6 hours for a Cuprophan membrane of similar thickness (Table 3).

about 65% by weight of repeating bisphenol A - carbonate units, said membrane being adaptable for use in a hemodialysis apparatus to preferentially remove middle molecular weight molecules from blood, wherein said membrane has a diffusive permeability to sodium chloride of about 800 to 860 cm/min $\times 10^{-4}$, a diffusive permeability to vitamin $B_{12}$ of greater than 105 cm/min $\times 10^{-4}$, an ultrafiltration rate of less than 4.0 ml/hr/M²/mmHg, both the diffusive permeabilities and ultrafiltration rate measured at 37° C, and a thickness of from about 0.60 mil to about 0.95 mil.

2. The membrane of claim 1 wherein the polyether polycarbonate block copolymer contains 15 to 35% by weight of repeating alkylene ether carbonate units and from 85 to 65% by weight of repeating bisphenol A-carbonate units.

3. An improved membrane prepared by a wet phase inversion technique using an aqueous gelation system, said membrane composed of a polyether-polycarbonate block copolymer having a molecular weight within the range of from about 200,000 to 500,000 as determined by intrinsic viscosity measurement, said block copolymer containing 5 to 35% by weight of repeating alkylene ether carbonate units and from 95 to about 65% by weight of repeating bisphenol A - carbonate units, said membrane being adaptable for use in a hemodialysis apparatus for preferentially removing middle molecular weight molecules from blood, wherein the ratio of diffusive permeability in cm/min ($\times 10^{-4}$) to ultrafiltration rate in ml/hr/M²/mmHg, measured at 37° C, for vitamin $B_{12}$ and sodium chloride are greater than 29 and 200 respectively, said membrane having a thickness of less than 0.95 mil.

Table 2

| Run Number | 1 | 2 | 3 | 4 | 5 | 6 | 7 | 8 | 9 | 10 | 11 | 12 | 13 |
|---|---|---|---|---|---|---|---|---|---|---|---|---|---|
| Polymer Molecular Weight | 260,800 | 319,000 | 292,850 | 308,000 | 314,550 | 351,500 | 327,150 | 327,150 | 365,350 | 313,650 | 313,750 | 361,800 | 328,100 |
| Casting Solution | | | | | | | | | | | | | |
| % Solids | 15.45 | 13.72 | 14.49 | 14.05 | 13.88 | 12.95 | 13.60 | 13.54 | 12.79 | 13.93 | 13.94 | 12.84 | 13.51 |
| Viscosity, cps | 9,460 | 10,160 | 10,430 | 10,110 | 9,950 | 9,360 | 9,220 | 9,120 | 10,020 | 8,530 | 9,600 | 9,280 | 10,760 |
| Nitrogen Flow, SCFH | 200 | 220 | 220 | 235 | 235 | 235 | 235 | 235 | 235 | 235 | 235 | 235 | 235 |
| Belt Speed, sec/ft | 15.2 | 17.5 | 16.3 | 17.1 | 17.3 | 18.5 | 17.6 | 17.6 | 18.8 | 17.2 | 17.1 | 18.7 | 17.7 |
| Membrane Properties | | | | | | | | | | | | | |
| Thickness, Mil | 0.85 | 0.73 | 0.83 | 0.76 | 0.82 | 0.73 | 0.81 | 0.82 | 0.85 | 0.85 | 0.81 | 0.80 | 0.82 |
| Burst Strength | 25.0 | 26.6 | 26.7 | 27.1 | 25.2 | 25.3 | 26.0 | 27.8 | 27.2 | 27.7 | 26.3 | 26.4 | 28.1 |
| Ultrafiltration Rate ml/hr/M²/mmHg | 4.04 | 3.18 | 3.84 | 2.98 | 3.14 | 3.18 | 3.53 | 3.78 | 3.83 | 3.81 | 4.27 | 3.90 | 3.51 |
| Diffusive permeability cm/min ($\times 10^4$) at 37° C | | | | | | | | | | | | | |
| $P_{NaCl}$ | 816 | 806 | 796 | 746 | 823 | 831 | 878 | 863 | 895 | 833 | 843 | 848 | 794 |
| $P_{B_{12}}$ | 118 | 111 | 104 | 113 | 108 | 126 | 118 | 119 | 122 | 118 | — | — | 101 |
| $P_{B_{12}}$/UF | 29.2 | 34.9 | 27.1 | 34.3 | 36.0 | 34.0 | 32.9 | 31.2 | 31.1 | 32.0 | 27.6 | — | — |
| $P_{NaCl}$/UF | 202 | 253 | 207 | 250 | 262 | 261 | 249 | 228 | 234 | 219 | 197 | — | — |

Table 3
Projections of Minimum Adequate Dialysis Time
(Based on Creatinine and $B_{12}$ Clearances)
(For average Body Mass patient of 5'7", 143 lbs.)

| DIALYZER | G. F. R = 0 | G. F. R. = 1 |
|---|---|---|
| D-4 Kiil Polycarbonate - 1M² | 11.1 hrs/wk. | 9.6 hrs/wk. |
| Gambro Cuprophan (17μ) - 1M² | 27.3 " | 18.0 " |
| Gambro Cuprophan (13.5μ) - 1M² | 18.6 " | 12.3 " |
| Travenol Cuprophan - 1M² | 18.6 10 " | 12.3 " |
| Dow 4 - Hollow Fiber Cellulose Acetate - 1M² | 20.4 " | 13.5 " |

QB = 200 QD = 500 QV = 5

What is claimed is:

1. An improved membrane prepared by a wet phase inversion technique using an aqueous gelation system, said membrane composed of a polyether-polycarbonate block copolymer containing 5 to 35% by weight of repeating alkylene ether carbonate units and from 95 to 4. The membrane of claim 3 having a thickness greater than 0.6 mils.

5. The membrane of claim 4 having an ultrafiltration rate of less than 4.0 ml/hr/M²/mmHg.

6. An improved hemodialysis membrane for preferential removal of middle molecular weight molecules from blood, said membrane being prepared by a wet phase inversion technique using an aqueous gelation system and comprising a polyether-polycarbonate block copolymer having a molecular weight within the range of from about 200,000 to 500,000 as determined by intrinsic viscosity measurement, said block copolymer containing 5 to 35% by weight of repeating alkylene ether carbonate units and from 95 to about 65% by weight of repeating bisphenol A -carbonate units, said membrane having a diffusive permeability measured at 37° C to sodium chloride of about 800 to 860 cm/min × $10^{-4}$, a diffusive permeability to vitamin $B_{12}$ measured at 37° C of greater than 105 cm/min × $10^{-4}$, an ultrafiltration rate measured at 37° C of less than 4.0 ml/hr/M²/mmHg and a thickness of from about 0.6 mil to about 0.95 mil.

7. A method of dialysing a patient comprising
   a. mounting a membrane in a hemodialyzer,
   b. connecting said hemodialyzer to a patient so that blood can be removed from the patient, passed through the hemodialyzer and returned to the patient in a closed loop,
   c. removing blood from a patient;
   d. passing said blood through a hemodialyzer wherein the blood is brought into contact with one face of a membrane mounted within said hemodialyzer while a dialysis liquid is simultaneously circulated through the hemodialyzer in contact with the opposite face of the membrane mounted in the hemodialyzer, the flow rates of the blood and dialysis liquid corresponding to the normal conditions of a hemodialysis process; and returning the dialyzed blood to the patient, the improvement being the use in the hemodialyzer of a membrane prepared by a wet phase inversion technique using an aqueous gelation system, said membrane composed of a polyether-polycarbonate block copolymer having a molecular weight within the range of from about 200,000 to 500,000 as determined by intrinsic viscosity measurement, containing 5 to 35% by weight of repeating alkylene ether carbonate units and from 95 to about 65% by weight of repeating bisphenol A - carbonate units, said membrane having a diffusive permeability measured at 37° C to sodium chloride of about 800 to 860 cm/min × $10^{-4}$, a diffusive permeability to vitamin $B_{12}$ measured at 37° C of greater than 105 cm/min × $10^{-4}$, an ultrafiltration rate measured at 37° C less than 4.0 ml/hr/M²/mmHg and a thickness of from about 0.6 mil to about 0.95 mil.

* * * * *

UNITED STATES PATENT AND TRADEMARK OFFICE
CERTIFICATE OF CORRECTION

PATENT NO. : 4,069,151
DATED : January 17, 1978
INVENTOR(S) : Willard S. Higley et al It is certified that error appears in the above-identified patent and that said Letters Patent are hereby corrected as shown below:

Col. 3, line 9, "descreased" should be --decreased--.

Col. 6, line 4, "polyetherpolycarbonate" should be --polyether-polycarbonate--.

Col. 9, line 58, "10" should be deleted.

Signed and Sealed this

Twenty-second Day of August 1978

[SEAL]

Attest:

RUTH C. MASON
Attesting Officer

DONALD W. BANNER
Commissioner of Patents and Trademarks